July 8, 1958 E. A. PETERS 2,842,155
THERMOSTATICALLY CONTROLLED WATER BYPASS VALVE
Filed June 14, 1956 2 Sheets-Sheet 1
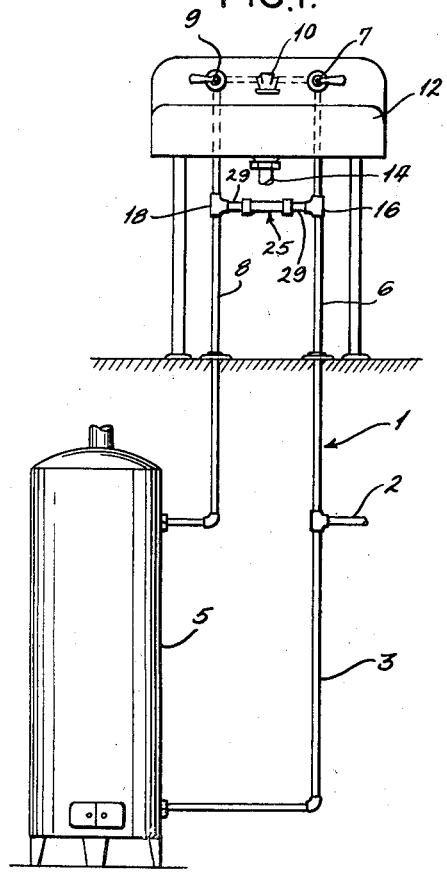
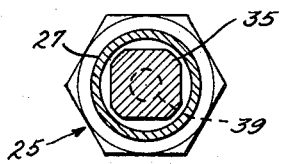
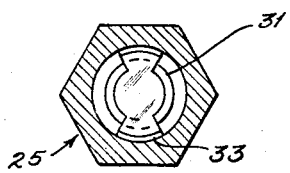
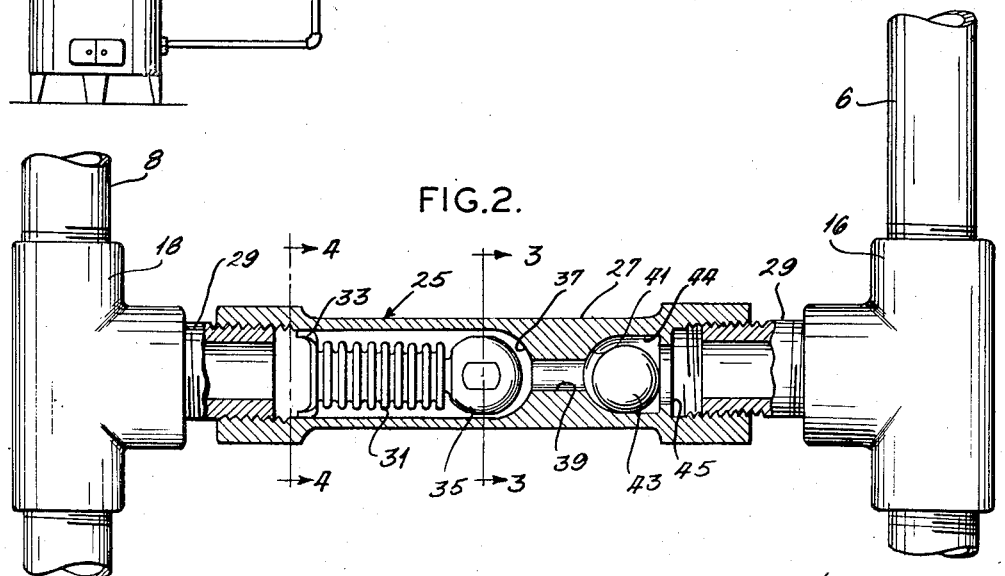
INVENTOR:
ERNST A. PETERS
By Philip R. Colster
ATTORNEY July 8, 1958 E. A. PETERS 2,842,155
THERMOSTATICALLY CONTROLLED WATER BYPASS VALVE
Filed June 14, 1956 2 Sheets-Sheet 2
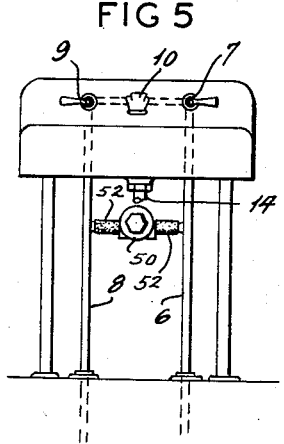
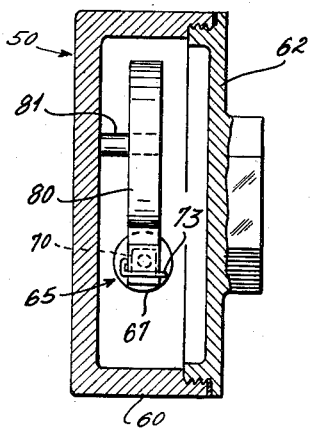
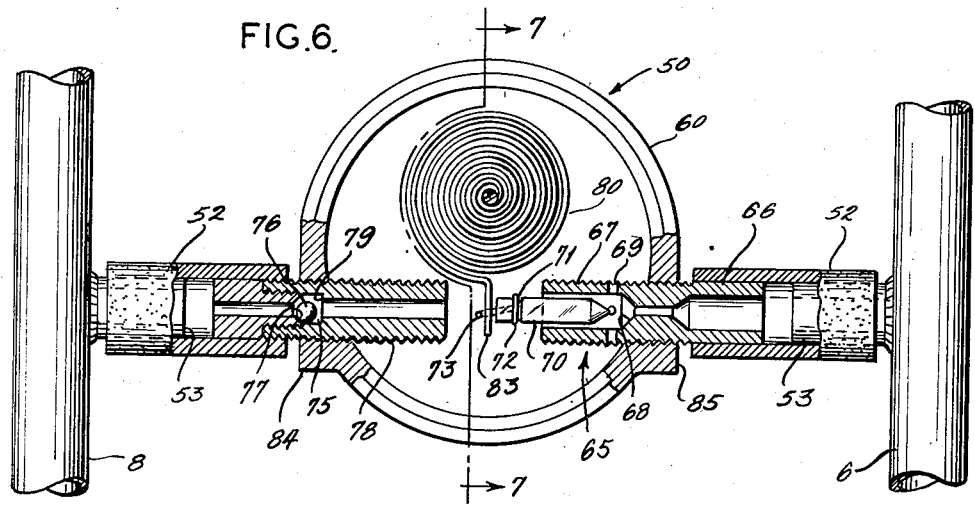
INVENTOR:
ERNST A. PETERS
By Philip B. Pohter
ATTORNEY United States Patent Office 2,842,155
Patented July 8, 1958

2,842,155

THERMOSTATICALLY CONTROLLED WATER BYPASS VALVE

Ernst A. Peters, Anna, Ill.

Application June 14, 1956, Serial No. 591,401

4 Claims. (Cl. 137—337)

This invention relates to liquid distribution systems wherein liquid at different temperatures is supplied to different pipes. The invention has particular application to domestic water systems wherein hot water is supplied through one series of pipes and cold water through another series of pipes to fixtures remote from a common source, but the application of the invention is not limited thereto.

In domestic water systems it is common to locate a water heater near the house water supply entrance pipe, commonly in the basement, and to pipe the hot water to fixtures at a considerable distance from the heater. When the hot water has not been drawn at such a remote fixture for some time, the water in the pipe between the heater and the fixture cools. The annoyance of having to wait for the hot water to reach the fixture has always been appreciated. The desirability of utilizing the warm water supplied by the heater to keep the cold water pipes from freezing has also been recognized. The idea of interconnecting the hot and cold water pipes at a point near the fixture most remote from the heater has been known for at least half a century. Messier, No. 489,971, shows such an interconnection. Chubb, No. 1,108,550, is a refinement of Messier, and a later Chubb patent, No. 1,247,374, issued in 1917, is a further refinement. In the latter patent, the hot and cold water pipes are not only interconnected, but a check valve is provided so as to cut off the flow of water from one pipe to the other when one of the faucets is opened.

The inconvenience of waiting for the hot water to arrive from the heater, and the desirability of keeping the cold water pipe from freezing have not diminished since 1917. On the contrary, other factors, arising in the past twenty-five years or so, have made the solution of the problem of providing hot water promptly and without waste, of even greater importance. One of these factors is the growing need for the conservation of water. Many farm homes with a relatively limited water supply are now equipped with running water, hence are being equipped with water heaters incorporated in the system. Many urban areas are deeply concerned with conserving their water supplies. Yet, in many, if not most domestic installations now in use, more water is run down the drain waiting for the hot water to arrive than is used after the hot water arrives.

Another important factor which has arisen in the past twenty-five years or so is the increased use of automatic machines which require hot water such, for example, as automatic wash machines and dishwashers. The effectiveness of such machines is markedly diminished if the water reaching them is not hot initially.

In spite of the continuing and, in fact, increased need for a device to accomplish practically what Chubb attempted to accomplish, no such device has heretofore been produced.

One of the objects of this invention is to provide a self-contained device which interconnects pipes conveying liquid at two different temperatures in such a way as to provide circulation between them sufficient to maintain the temperature of liquid within the warmer of the two pipes at a predetermined level of the locus of interconnection.

Other objects will become apparent to those skilled in the art in the light of the following disclosure and accompanying drawing.

In accordance with this invention, generally stated, a device is provided which interconnects a pipe carrying liquid at one temperature with a pipe carrying a liquid at a different temperature. The device contains means for interrupting the connection between the two pipes when the pressure in one falls substantially below the pressure in the other. The device also contains temperature responsive mechanism operatively connected to a valve in such a way that heating of the temperature responsive mechanism causes the valve to tend toward its closed position, and cooling of the temperature responsive mechanism causes the valve to tend toward its open position. Preferably the temperature responsive mechanism is primarily responsive to the temperature of the liquid, but is also in part responsive to the temperature of the ambient atmosphere.

In the drawing, Figure 1 is a view in side elevation, partly in section and partly broken away, showing a water distribution system in which a device constructed in accordance with an illustrative embodiment of this invention is incorporated;

Figure 2 is an enlarged fragmentary view partly in section of the device shown in Figure 1 in place in the system;

Figure 3 is a sectional view taken along the line 3—3 of Figure 2;

Figure 4 is a sectional view taken along the line 4—4 of Figure 2;

Figure 5 is a view in front elevation of a device constructed in accordance with another embodiment of this invention, installed in a domestic water system;

Figure 6 is an enlarged fragmentary view, partly in section, of the embodiment of device shown in Figure 5, in place in the system; and Figure 7 is a sectional view taken along the line 7—7 of Figure 6.

Referring now to the drawing for illustrative embodiments of this invention, reference numeral 1 indicates a domestic hot water system having a single entrance pipe 2 from a source of water not here shown. A water heater 5 is connected to the entrance pipe 2 by a pipe 3. From the entrance pipe 2, a cold water pipe 6 extends to a cold water valve 7. From the heater 5, a hot water pipe 8 extends to a hot water valve 9. The cold water valve 7 and the hot water valve 9 are each connected to control the admittance of water to a faucet 10 of a basin 12. The basin 12 is equipped with the usual drain 14.

Referring particularly to Figures 1 through 4, the cold water pipe 6 is provided, close beneath the basin 12, with a T 16. A corresponding T 18 is provided in the hot water pipe 8. Between the T 16 and the T 18 is a control 25 constructed in accordance with one illustrative embodiment of this invention. The device 25 of this embodiment takes the form of a cylindrical housing 27 internally threaded at its ends to receive nipples 29. The nipples 29, threaded into the T's 16 and 18 serve to connect the device 25 with the hot water pipe 8 and the cold water pipe 6.

Within the housing 27 is a bellows type temperature responsive element 31, supported at one end by a spider 33, and connected at its other end to a valve ball 35. The valve ball 35 is positioned to seat in a valve seat 37. A restricted passage 39 extends from the valve seat 37 to a check valve seat 41. A check valve ball 43 is positioned within a cage 44 defined by the check valve seat 41, the inside wall of the housing 27, and an annular shoulder 45.

The temperature responsive element 31 consists of a metallic bellows filled with a fluid with a high coefficient of expansion, so that when the fluid is heated, the bellows is extended by the force of the expanding fluid, and when the fluid is cooled, the inherent resilience of the bellows makes it retract as the fluid contracts. The spider 33 is securely anchored within the housing 27. It can be seen that the distance of the valve ball 35 from the seat 37, i. e., the amount of restriction exerted by the valve ball 35 at a given temperature, is determined by the position of the spider 33. The farther the spider 33 is from the valve seat 37, the greater must be the expansion of the bellows to seat the valve ball 35 in the valve seat 37. Thus the effective operating temperature of the device may be regulated by selective positioning of the spider 33.

The valve ball 35 is flattened as indicated in Figures 2 and 3 to permit the passage of liquid except when the valve ball seats in the seat 37.

In operation, when the valves 7 and 9 are closed, so that the system is in equilibrium, as the water in the hot water pipe 8 begins to cool, the temperature responsive element 31 contracts, unseating the valve ball 35 from the valve seat 37. The check valve ball 43 is in the position shown in Figure 2, permitting water to circulate from the hot water pipe through the control 25 to the cold water pipe 6. As the temperature of the water reaching the control increases, the temperature responsive element 31 acts to move the valve ball 35 to its seated position, and cut off the flow of water between the two pipes.

It can be seen that while the temperature responsive element 31 is primarily controlled by the temperature of the water in the pipe 8, it is, to some extent, also influenced by the temperature of the ambient atmosphere. This is important in that in very cold weather, it is desirable to maintain a more vigorous circulation than in warm weather. If the pipe 8 is well enough insulated, the water in the pipe 6 might freeze but for the effect of the temperature of the ambient atmosphere upon the temperature responsive element 31.

When the hot water valve 9 is opened, the drop in pressure in the pipe 8 unbalances the system and the check valve ball 43 is seated in its check valve seat 41. When the cold water valve 7 is opened, the drop in pressure in the pipe 6 unbalances the system and the check valve ball 43 is seated in the seat defined by the annular shoulder 45. In the latter case, the function of the check valve ball 43 is not so important, because as hot water reaches the temperature responsive element 31, the valve ball 35 moves to cut off the flow of hot water anyway. As has been pointed out heretofore, when both valves 7 and 9 are closed, the pressure in the two pipes 6 and 8 is equal, and the check valve ball 43 is gravity biased to the position shown in Figure 2. The force of the thermally induced circulation is not sufficient to seat the valve ball 43.

Referring now to Figures 5–7 for another embodiment of the device of this invention, reference numeral 50 indicates the complete control. As shown particularly in Figures 5 and 6 the control 50 is mounted between the hot water pipe 8 and the cold water pipe 6 by means of sections of rubber tubing 52 mounted on plain nipples 53 which are welded, brazed, soldered, or otherwise connected to the pipes 6 and 8. In this embodiment, the control 50 includes a housing 60 closed by a watertight cover 62, a regulating valve 65, controlled by a spiral temperature responsive element 80, and a check valve 75. The temperature responsive element 80 is secured to a fixed post 81 which is integral with or fixedly secured to the inside wall of the housing 60, as shown in Figure 7.

The check valve 75 consists of a check valve ball 76, and a cage within which the check valve ball 76 is confined, the cage being defined by a check valve seat 77, the inside wall of a tube 78, and an annular shoulder 79. The tube 78 is threaded externally and screwed through an internally threaded boss 84 in the housing 60.

The valve 65 is made up of a tube 66 with an extended externally threaded section 67 which is screwed through an internally threaded boss 85 in the housing 60; a valve seat 68 within the tube 66; ports 69 extending radially through the wall of the tube 66 and positioned between the valve seat 68 and the inner open end of the tube 66, and a valve plunger 70. The valve plunger 70 has a conical end complementary with the valve seat 68. At its other end, the plunger 70 is provided with a circumferential groove 71 in which a clip 72 is securely mounted. The clip 72 has an arm 73 which extends around a finger 83 on the temperature responsive element 80, so that the finger 83 is confined between the arm 73 of the clip and the end of the plunger 70.

The construction of the temperature responsive element 80 is such that when the element is heated, the finger 83 moves to the right as viewed in Figure 6, toward valve closing position. When the element 80 is cooled, the finger 83 moves in the opposite direction.

It can be seen that by screwing the tube 66 farther into the chamber of the housing 60, the valve seat 68 is moved closer to the plunger 70 for a given temperature. Thus the cut off temperature of the device can be regulated by moving the tube 66 in or out.

In operation, assuming that the valves 7 and 9 are closed, so that the system is in equilibrium, as the water in the housing 60 cools, the finger 83 of the temperature responsive element 80 moves to the left as viewed in Figure 6, engaging the arm 73 of the clip 72, and moving the plunger 70 away from the valve seat 68. The hot water pipe 8 and the cold water pipe 6 are thus interconnected, the warm water passing through the tube 78, into the chamber of the housing 60, through the ports 69 and tube 66 into the cold water pipe 6. As the temperature in the housing 60 rises, the heating of the temperature responsive element 80 causes the finger 83 to move to the right as viewed in Figure 6, engaging the end of the plunger 70 and moving the cone shaped end of the plunger toward, and ultimately against, the seat 68, to restrict and then cut off the flow of water.

The check valve 75 of this embodiment works in the same manner as the corresponding check valve of the embodiment shown in Figure 2. Thus, when the hot water valve 9 is open, while the cold water valve 7 is closed, the check valve ball 76 is seated by the force of the water in the pipe 6, which is under greater pressure than that in the open ended pipe 8, in the check valve seat 77. When the cold water valve 7 is open while the hot water valve 9 is closed, the force of the water in the pipe 8 will seat the check valve ball 76 in the seat defined by the annular shoulder 79. When both valves 7 and 9 are closed, the pressure in the two pipes is equal and the check valve ball 76 is gravity biased to the position shown in Figure 6. The thermal current is not sufficient to seat the valve ball 76.

The embodiment shown in Figures 5 through 7 is the preferred embodiment. The construction of the housing 60 is such as to expose a greater surface to the ambient atmosphere than the housing of the embodiment shown in Figures 1–4, and the circulation of water within the housing itself is greater in the second embodiment. The passages into and out of the chamber within the housing 60 are greatly restricted as compared with the size of the chamber so that the temperature of the water reaching the chamber is in a sense integrated, and the temperature responsive element will not be greatly affected by "slugs" of hot or cold water. Thus, the temperature responsive element is more sensitive to the temperature condition of the ambient atmosphere than is the temperature responsive element shown in Figures 1 through 4. The use of the rubber tubing 52 also has certain advantages over the rigid connection of the first embodiment. It is simple to install in existing systems. To that end, it is only necessary to drill holes in the water pipes, solder or otherwise secure a plain nipple to the pipe, and install the control device by means of the rubber tubing. Suitable clamps may of course be used to ensure a tight connection. An additional advantage to this arrangement lies in the minimizing of shock to the system when the check valve closes in response to the opening of one of the faucets.

It can be seen that various features of the first embodiment can be incorporated in the second embodiment and vice versa. Numerous other variations in the construction of the device within the scope of the appended claims will occur to those skilled in the art in the light of the foregoing disclosure.

It can be appreciated that in a system in which a number of fixtures are attached to common hot and cold water pipes, the device of this invention need be installed at only the most remote of the fixtures from the hot water heater to keep the entire hot water system warm. It may even be installed beyond the most remote fixture.

It is also apparent that the device of this invention can be installed at any other place along the line, although preferably it is installed as close to the most remote outlet as possible. It is also within the contemplation of this invention to incorporate a device of this invention with the usual valve and mixing system assembly so that the entire assembly, with the device of this invention in between and by-passing the valves, can be installed as a unit.

Having thus described the invention, what is claimed and desired to be secured by Letters Patent is:

1. In combination with a water supply system having a cold water supply pipe, a hot water supply pipe, and a water heater, said hot water and cold water supply pipes being connected to said water heater, a device interconnecting said pipes at a place above said water heater and comprising a valve, a temperature responsive element operatively connected to said valve to move said valve toward closed position in response to heating of said temperature responsive element and toward open position in response to cooling of said element, said temperature responsive element being positioned and arranged to respond to the temperature of water from the hot water supply pipe and to the temperature of the ambient atmosphere, and means for closing said device when the pressure in one of said hot water supply and cold water supply pipes drops substantially below the other.

2. In combination with a liquid supply system having a cold liquid supply, a hot liquid supply, and a liquid heater, said hot liquid supply and said cold liquid supply being connected to said liquid heater, a device interconnecting said supplies at a place above said liquid heater and comprising a valve, a temperature responsive element operatively connected to said valve to move said valve toward closed position in response to heating of said temperature responsive element and toward open position in response to cooling of said element, said temperature responsive element being positioned and arranged to respond to the temperature of liquid from the hot liquid supply, and means for cutting off the communication between said supplies through said device when the pressure in one of said supplies becomes substantially different from the pressure in the other.

3. The device of claim 1 wherein the temperature responsive element is a metal spiral positioned within a chamber communicating with the hot and cold water pipes through openings which are small compared with the said chamber.

4. The combination of claim 1 wherein the device is resiliently connected to and between the hot and cold water pipes.

No references cited